United States Patent
Wang et al.

(10) Patent No.: US 10,162,433 B2
(45) Date of Patent: Dec. 25, 2018

(54) OPTICAL NAVIGATION APPARATUS WITH DEFOCUSED IMAGE COMPENSATION FUNCTION AND COMPENSATION CIRCUIT THEREOF

(71) Applicant: PIXART IMAGING INC., Hsin-Chu (TW)

(72) Inventors: Guo-Zhen Wang, Hsin-Chu (TW); Hsuan-Ku Chen, Hsin-Chu (TW)

(73) Assignee: PIXART IMAGING INC., Hsin-Chu (TW)

( * ) Notice: Subject to any disclaimer, the term of this patent is extended or adjusted under 35 U.S.C. 154(b) by 282 days.

(21) Appl. No.: 15/155,294

(22) Filed: May 16, 2016

(65) Prior Publication Data

US 2017/0131800 A1    May 11, 2017

(30) Foreign Application Priority Data

Nov. 6, 2015 (TW) .............................. 104136650 A

(51) Int. Cl.
*G06K 9/40* (2006.01)
*G06F 3/0354* (2013.01)
*G06F 3/03* (2006.01)

(52) U.S. Cl.
CPC ........ *G06F 3/03543* (2013.01); *G06F 3/0304* (2013.01); *G06F 3/0317* (2013.01)

(58) Field of Classification Search
None
See application file for complete search history.

(56) References Cited

U.S. PATENT DOCUMENTS

| 5,756,981 | A | * | 5/1998 | Roustaei | ................. G03F 7/705 235/462.07 |
| 6,154,574 | A | * | 11/2000 | Paik | ....................... G06T 5/003 250/201.2 |
| 6,166,853 | A | * | 12/2000 | Sapia | ..................... G02B 21/00 359/559 |
| 7,440,637 | B2 | * | 10/2008 | Schechner | ........... H04N 5/2254 348/E5.028 |

(Continued)

FOREIGN PATENT DOCUMENTS

| CN | 1924774 A | 3/2007 |
| TW | 200807280 A | 2/2008 |

(Continued)

*Primary Examiner* — Jayesh A Patel
(74) *Attorney, Agent, or Firm* — Li & Cai Intellectual Property (USA) Office

(57) ABSTRACT

The present disclosure illustrates an optical navigation apparatus with defocused image compensation function and a compensation circuit thereof. The optical navigation apparatus comprises a light source, an image sensing circuit and a compensation circuit. The light source is configured to illuminate a work surface. The image sensing circuit captures a first image related to the work surface. The compensation circuit is configured to transform the first image and a point spread function of the light source into a first conversion result and a second conversion result in frequency domain, respectively, and then transform a result multiplied by the first conversion result and a reciprocal of the second conversion result from frequency domain to time domain to generate a second image.

8 Claims, 1 Drawing Sheet

(56) References Cited

U.S. PATENT DOCUMENTS

| | | | | |
|---|---|---|---|---|
| 7,474,297 B2 * | 1/2009 | Moyer | ................. | G06F 3/0317 345/156 |
| 8,022,931 B2 * | 9/2011 | Soo | ..................... | G06F 3/03543 345/156 |
| 8,090,212 B1 * | 1/2012 | Baxansky | ............... | H03F 3/217 382/260 |
| 8,503,828 B2 * | 8/2013 | Kondo | ................. | G06T 3/4053 348/208.4 |
| 2003/0002746 A1 * | 1/2003 | Kusaka | ................. | H04N 5/217 382/255 |
| 2003/0184663 A1 * | 10/2003 | Nakano | ............... | H04N 1/4092 348/241 |
| 2005/0047672 A1 * | 3/2005 | Ben-Ezra | ............ | H04N 5/2258 382/255 |
| 2005/0265621 A1 * | 12/2005 | Biggs | ...................... | G06T 5/002 382/260 |
| 2006/0045314 A1 * | 3/2006 | Gao | ..................... | G01B 11/002 382/106 |
| 2006/0215168 A1 * | 9/2006 | Gouch | ................... | G06T 5/009 356/456 |
| 2007/0009169 A1 * | 1/2007 | Bhattacharjya | .... | H04N 5/23248 382/255 |
| 2007/0242142 A1 * | 10/2007 | Okazaki | ................ | G03B 13/18 348/239 |
| 2007/0258707 A1 * | 11/2007 | Raskar | ................... | G03B 17/00 396/52 |
| 2008/0170124 A1 * | 7/2008 | Hatanaka | ................ | G06T 5/004 348/208.4 |
| 2009/0027508 A1 * | 1/2009 | Miki | .................. | H04N 5/23248 348/208.99 |
| 2010/0054590 A1 * | 3/2010 | Jiang | ....................... | G06K 9/40 382/167 |
| 2011/0090352 A1 * | 4/2011 | Wang | ..................... | G06T 5/003 348/208.6 |
| 2011/0148764 A1 * | 6/2011 | Gao | ...................... | G06F 3/0317 345/163 |
| 2011/0222764 A1 * | 9/2011 | Kim | ....................... | G06T 5/003 382/167 |
| 2014/0169694 A1 * | 6/2014 | Yoshikawa | ............. | G06T 5/001 382/260 |
| 2014/0375847 A1 * | 12/2014 | Kasahara | ................ | H04N 5/357 348/241 |
| 2016/0027156 A1 * | 1/2016 | Naruse | .................... | H04N 1/58 382/167 |

FOREIGN PATENT DOCUMENTS

| | | |
|---|---|---|
| TW | 200922304 A | 5/2009 |
| TW | 201133111 A | 10/2011 |

* cited by examiner

OPTICAL NAVIGATION APPARATUS WITH DEFOCUSED IMAGE COMPENSATION FUNCTION AND COMPENSATION CIRCUIT THEREOF

BACKGROUND OF THE INVENTION

1. Field of the Invention

The instant disclosure relates to an optical navigation apparatus with defocus image compensation function and a compensation circuit thereof, in particular, to an optical navigation apparatus and a compensation circuit thereof which can perform a deconvolution operation via a point spread function to compensate for the defocused image.

2. Description of Related Art

Conventional optical navigation apparatus (such as an optical mouse) projects light to a work surface, and then captures a plurality of successive images related to the work surface by utilizing an image sensing circuit. The captured images are used for comparison and analysis to determine the amount of an offset of the optical navigation apparatus within a time interval for controlling a cursor displayed on the screen according to the amount of the offset, so as to arrive at the effect of navigation.

However, the position of the image sensing circuit disposed in the optical navigation apparatus should be controlled within a certain range, otherwise the captured images will be out of focus. Thus, in the case of the optical navigation apparatus when assembly tolerances are missed, the captured image will be easily out of focus and blur, affecting the correction of offset calculation and decreasing positioning accuracy.

SUMMARY OF THE INVENTION

An embodiment of the present disclosure provides an optical navigation apparatus with defocus image compensation function, wherein the optical navigation apparatus comprises a light source, an image sensing circuit and a compensation circuit. The light source is configured to illuminate a work surface. The image sensing circuit is configured to capture a first image related to the work surface. The compensation circuit is configured to respectively transform the first image and a point spread function into a first conversion result and a second conversion result in a frequency domain, and execute a multiplication operation for the first conversion result and a reciprocal of the second conversion result, and then transform a result multiplied by the first conversion result and the reciprocal of the second conversion result from the frequency domain to a time domain to generate a second image.

An embodiment of the present disclosure provides a compensation circuit, wherein the compensation circuit provides an operation of the defocus image compensation function of an optical navigation apparatus. The optical navigation apparatus comprises a light source for illuminating a work surface and an image sensing circuit for capturing a first image that is related to the work surface illuminated by the light source. The optical navigation apparatus comprises an analytic function establishing unit, a transfer unit and an operation processing unit. The analytic function establishing unit is configured to generate a point spread function (PSF) related to the light source. The transfer unit is configured to respectively transform the first image and the PSF into a first conversion result and a second conversion result in a frequency domain, and transform a result multiplied by the first conversion result and a reciprocal of the second conversion result from the frequency domain to a time domain to generate a second image. The operation processing unit is configured to execute a multiplication operation for the first conversion result and the reciprocal of the second conversion result to obtain the result.

An embodiment of the present disclosure provides an optical navigation apparatus with defocus image compensation function, wherein the optical navigation apparatus comprises a light source, an image sensing circuit and a compensation circuit. The light source is configured to illuminate a work surface. The image sensing circuit is configured to capture a first image that is related to the work surface illuminated by the light source. The compensation circuit is configured to execute an operation for the first image to generate a second image according to a point spread function.

To sum up, the optical navigation apparatus with defocus image compensation function and the compensation circuit according to the embodiment of the present disclosure can perform an image deblurring algorithm for the first image captured by the image sensing circuit according to the PSF related to the light source of the optical navigation apparatus to compensate for the impact caused by the defocused images, so as to enhance the positioning accuracy.

In order to further the understanding regarding the instant disclosure, the following embodiments are provided along with illustrations to facilitate the disclosure of the instant disclosure.

BRIEF DESCRIPTION OF THE DRAWINGS

Embodiments are illustrated by way of example and not by way of limitation in the figures of the accompanying drawings, in which like references indicate similar elements and in which.

DETAILED DESCRIPTION OF THE PREFERRED EMBODIMENTS

Figure 1:
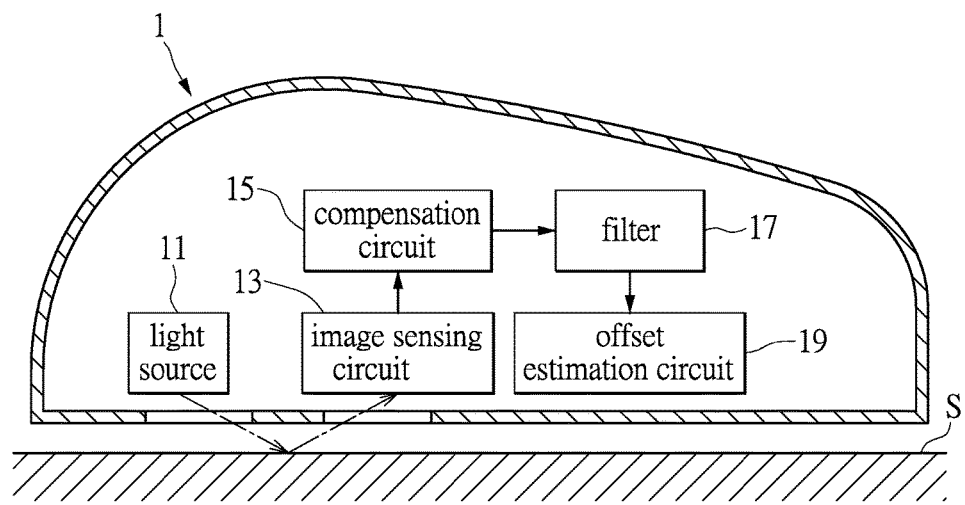
FIG. 1 shows a block diagram of an optical navigation apparatus with defocused image compensation function according to an embodiment of the instant disclosure.

Reference will now be made in detail to the exemplary embodiments of the present disclosure, examples of which are illustrated in the accompanying drawings. Wherever possible, the same reference numbers are used in the drawings and the description to refer to the same or like parts.

Firstly, please refer to FIG. 1 showing a block diagram of an optical navigation apparatus with defocus image compensation function according to an embodiment of the instant disclosure. The optical navigation apparatus 1 comprises a light source 11, an image sensing circuit 13 and a compensation circuit 15. The image sensing circuit 13 and the compensation circuit 15 can be implemented completely by hardware circuits, or implemented by hardware circuits cooperating with firmware or software. In short, the instant disclosure does not limit the implementation manner of the optical navigation apparatus 1. Additionally, the light source 11, the image sensing circuit 13 and the compensation circuit 15 can be integrated or arranged individually, and the instant disclosure is not limited thereby. In addition, the exact positions of the light source 11, the image sensing circuit 13 and the compensation circuit 15 disposed in the optical navigation apparatus 1 shall not be limited to the positions illustrated by FIG. 1, those skilled in the art may design according to practical demands or applications.

In detail, the light source 11 is used to illuminate a work surface S. Accordingly, the light source 11 can be implemented by one or more light emitting diodes (LED), laser diodes or any type of active light elements that the skilled in the art know. In short, the present disclosure does not limit the exact type or exact number of the light source 11. Additionally, the light source 11 can be a visible light, an invisible light or an infrared light, and the instant disclosure is not limited.

Secondly, the image sensing circuit 13 captures a first image related to the work surface S illuminated by the light source 11. Accordingly, the image sensing circuit 13 can be implemented by a charge-coupled device (CCD), a complementary metal-oxide-semiconductor (CMOS) or any type of image sensor that the skilled in the art know. In short, the present disclosure does not limit the exact type of the image sensing circuit 13. It is worth noting that since the light source 11 and the image sensing circuit 13 are known by those skilled in the art, detailed descriptions thereof are omitted herein.

Then, the compensation circuit 15 is used to respectively transform the first image and a point spread function into a first conversion result and a second conversion result in a frequency domain, and execute a multiplication operation for the first conversion result and a reciprocal of the second conversion result, and then transform a result multiplied by the first conversion result and the reciprocal of the second conversion result from the frequency domain to a time domain to generate a second image.

Further, as aforementioned, since the position of the image sensing circuit 13 disposed in the optical navigation apparatus 1 should be controlled within a certain range, therefore, in the case of when the optical navigation apparatus 1 assembly tolerances are missed, the position of the image sensing circuit 13 would exceed the imaging range of Depth of field (DOF), so that the first image captured by the image sensing circuit 13 will be out of focus and blur. Accordingly, one object of the optical navigation apparatus 1 of the present invention is to perform an image deblurring algorithm for the first image captured by the image sensing circuit 13 by using the internal compensation circuit 15, so as to compensate the impact caused by the defocus images and enhance the positioning accuracy.

Therefore, for further explaining the effect brought by the compensation circuit 15 executes the compensation for the defocus images, the present invention further assumes that the first image is blur and out of focus to be exemplified. Thus, according to aforementioned content and current technology, the first image captured by the image sensing circuit 13 can be collected by the skilled in the art and expressed as follows, $$b(x)=\mathrm{psf}(x)*o(x)+n(x).$$

Wherein $b(x)$ is the first image, $\mathrm{psf}(x)$ is known the point spread function related to the light source 11, $o(x)$ is the first image which is not blurred and out of focus, $n(x)$ is the noise, and * is expressed as a convolution operation.

Since the point spread function is known by those skilled in the art, detailed descriptions thereof are omitted herein. In practice, the point spread function related to the light source 11 can be generated by the compensation circuit 15 of the optical navigation apparatus 1 in accordance with an embodiment of the present invention, but the instant disclosure is not limited. Additionally, according to the above teachings as well as known information, those skilled in the art should understand that the convolution operation for the function of the above equation is correspondingly expressed as a result of the Fourier transfer function. Thus, the above equation can be expressed as follows, $$B(k)=\mathrm{PSF}(k)O(k)+N(k).$$

Accordingly, those skilled in the art should understand that the compensation circuit 15 transforms the first image $b(x)$ and $\mathrm{psf}(x)$ to the first conversion result $B(k)$ and the second conversion result $\mathrm{PSK}(k)$ respectively in the frequency domain. Additionally, according to the above teachings as well as known information, those skilled in the art should understand that the image deblurring algorithm for the first image $b(x)$ performed by the compensation circuit 15 can be expressed as follows, $$B(k)/\mathrm{MTF}(k)=O(k)+N(k)/\mathrm{MTF}(k).$$

Wherein $1/\mathrm{MTF}(k)$ is expressed as a reciprocal after the point spread function $\mathrm{psf}(x)$ being transformed. In other words, $1/\mathrm{MTF}(k)$ is a reciprocal of the second conversion result. However, it is furthermore assumed that the noise $n(x)$ has been omitted. That is, the above equation can be expressed as follows, $$B/\mathrm{MTF} \approx O.$$

In other words, the result, which is the compensation circuit 15 executing a multiplication operation for the first conversion result and the reciprocal of the second conversion result, is B/MTF, wherein B is the first conversion result and 1/MTF is the reciprocal of the second conversion result. Those skilled in the art should understand that the result multiplied by the first conversion result and the reciprocal of the second conversion result is also a result in the frequency domain. Accordingly, the compensation circuit 15 will need to transform the result from the frequency domain to a time domain, so as to completely generate the second image. It is worth noting that, the aforementioned content for the first conversion result and the second conversion result transformed by the first image and the point spread function, can be expressed as respectively executing a fast fourier transform for the first image and the point spread function to obtain the first conversion result corresponding to the first image and the second conversion result corresponding to the point spread function. In short, the instant disclosure does not limit the implementation manner of the aforementioned content.

On the other hand, please refer again to FIG. 1, the optical navigation apparatus 1 further comprises a filter 17 and an offset estimation circuit 19. The filter 17 is configured to filter the second image and output a filtered second image. The offset estimation circuit 19 is configured to capture a plurality of filtered second images within a time interval, and determine a shift amount of the optical navigation apparatus 1 according to the filtered second images.

Those skilled in the art should understand that the optical navigation apparatus 1 of the present disclosure can calculate a second image by using the internal compensation circuit 15, and the second image is substantially identical to the first image $o(x)$ which is not blurred and out of focus, so as to compensate for the impact caused by the defocused images and enhance the positioning accuracy. In addition, the present invention also can effectively enhance the range of assembly tolerances.

Figure 2:
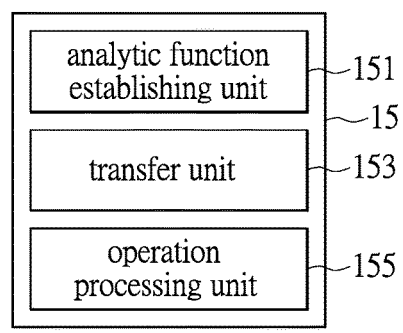
FIG. 2 shows a block diagram of a compensation circuit of an optical navigation apparatus with defocused image compensation function according to an embodiment of the instant disclosure.

For further describing details of the compensation circuit 15 of the optical navigation apparatus 1, this instant disclosure provides an exemplary embodiment of the compensation circuit 15. Please refer to FIG. 2 showing a block diagram of a compensation circuit of an optical navigation apparatus with defocus image compensation function according to an embodiment of the instant disclosure. However, the following descriptions only illustrate a detailed embodiment of the compensation circuit 15 of the optical navigation apparatus 1, and the instant disclosure is not limited. The given compensation circuit 15 in this embodiment can be operated in the optical navigation apparatus 1 shown in FIG. 1, thus please refer to FIG. 1 and FIG. 2 simultaneously for better understanding. Elements in FIG. 2 being the same or similar to elements of FIG. 1 are presented by the same reference numbers, thus the redundant information is not repeated.

In detail, the compensation circuit 15 comprises an analytic function establishing unit 151, a transfer unit 153 and an operation processing unit 155. The analytic function establishing unit 151, the transfer unit 153 and the operation processing unit 155 can be implemented completely by hardware circuits, or implemented by hardware circuits cooperating with firmware or software. In short, the instant disclosure does not limit the implementation manner of the compensation circuit 15. It is worth to note that the analytic function establishing unit 151, the transfer unit 153 and the operation processing unit 155 can be integrally or separately configured, but it is not limited herein.

Further, the analytic function establishing unit 151 is configured to generate a point spread function related to the light source 11. The transfer unit 153 is configured to respectively transform the first image and the point spread function into a first conversion result and a second conversion result in the frequency domain, and transform a result, which is multiplied by the first conversion result and a reciprocal of the second conversion result, from the frequency domain into a time domain to generate a second image. The operation processing unit 155 is configured to execute a multiplication operation for the first conversion result and a reciprocal of the second conversion result to obtain the result.

In short, since the light source 11 after focusing has formed an enlarged image point, thus, the point spread function describes the analytic functions of the optical navigation apparatus 1 to the light source 11. Accordingly, the present invention can be accurately captured the image related to the optical navigation apparatus 1 by using the point spread function. It is worth noting that, the instant disclosure does not limit the implementation manner of the analytic function establishing unit 151 to generate the point spread function, those skilled in the art may design according to practical demands or applications.

Those skilled in the art should understand that the transfer unit 153 is further configured to respectively execute a fast fourier transform for the first image and the point spread function to obtain the first conversion result and the second conversion result, and transform the result multiplied by the first conversion result and a reciprocal of the second conversion result from the frequency domain to a time domain to generate the second image. Finally, in a similar way, the multiplication result executed by the operation processing unit 155 is expressed as B/MTF, wherein B is the first conversion result and 1/MTF is the reciprocal of the second conversion result.

The above embodiments of the transfer unit 153 and the operation processing unit 155 are for illustrating but not for limiting the instant disclosure. Those skilled in the art should understand that the object of the optical navigation apparatus of the present invention is to calculate the first image according to a point spread function, and generate a second image, which is not blurred and out of focus, corresponding to the first image.

The provided optical navigation apparatus with defocus image compensation function and the compensation circuit thereof can perform an image deblurring algorithm for the first image captured by the image sensing circuit according to the PSF related to the light source of the optical navigation apparatus, so as to compensate for the impact caused by the defocused images and enhance the positioning accuracy.

The above-mentioned descriptions represent merely the exemplary embodiment of the present disclosure, without any intention to limit the scope of the present disclosure thereto. Various equivalent changes, alterations or modifications based on the claims of the present disclosure are all consequently viewed as being embraced by the scope of the present disclosure.

What is claimed is:

1. An optical navigation apparatus with defocused image compensation function, comprising:
   a light source, configured to illuminate a work surface;
   an image sensing circuit, configured to capture a first image that is related to the work surface illuminated by the light source; and
   a compensation circuit, configured to respectively transform the first image and a point spread function into a first conversion result and a second conversion result in a frequency domain, and execute a multiplication operation for the first conversion result and a reciprocal of the second conversion result, and then transform a result multiplied by the first conversion result and the reciprocal of the second conversion result from the frequency domain to a time domain to generate a second image.

2. The optical navigation apparatus of claim 1, wherein the result multiplied by the first conversion result and the reciprocal of the second conversion result is B/MTF, wherein B is the first conversion result and 1/MTF is the reciprocal of the second conversion result.

3. The optical navigation apparatus of claim 1, wherein the compensation circuit is further configured to respectively execute a fast fourier transform for the first image and the point spread function to obtain the first conversion result corresponding to the first image and the second conversion result corresponding to the point spread function.

4. The optical navigation apparatus of claim 1, wherein the optical navigation apparatus further comprises:
   a filter, configured to filter the second image to output a filtered second image; and
   an offset estimation circuit, configured to capture a plurality of filtered second images within a time interval, and determine a shift amount of the optical navigation apparatus according to the filtered second images.

5. A compensation circuit, providing the operation of the defocused image compensation function of an optical navigation apparatus, wherein the optical navigation apparatus comprises a light source for illuminating a work surface and an image sensing circuit for capturing a first image that is related to the work surface illuminated by the light source, the compensation circuit comprising:
   an analytic function establishing unit, configured to generate a point spread function related to the light source;
   a transfer unit, configured to respectively transform the first image and the point spread function into a first conversion result and a second conversion result in a frequency domain, and transform a result multiplied by the first conversion result and a reciprocal of the second conversion result from the frequency domain to a time domain to generate a second image; and an operation processing unit, configured to execute a multiplication operation for the first conversion result and the reciprocal of the second conversion result to obtain the result.

6. The compensation circuit according to claim 5, wherein the result multiplied by the first conversion result and the reciprocal of the second conversion result is B/MTF, wherein B is the first conversion result and 1/MTF is the reciprocal of the second conversion result.

7. The compensation circuit according to claim 5, wherein the transfer unit is further configured to respectively execute a fast fourier transform for the first image and the point spread function to obtain the first conversion result corresponding to the first image and the second conversion result corresponding to the point spread function.

8. The compensation circuit according to claim 5, wherein the optical navigation apparatus further comprises:

a filter, configured to filter the second image to output a filtered second image; and an offset estimation circuit, configured to capture a plurality of filtered second images within a time interval, and determine a shift amount of the optical navigation apparatus according to the filtered second images.

* * * * *